(12) United States Patent
Wakahara

(10) Patent No.: US 10,663,324 B2
(45) Date of Patent: May 26, 2020

(54) OPTICAL FIBER SENSOR

(71) Applicant: CMIWS CO., LTD., Kyoto (JP)

(72) Inventor: Masahito Wakahara, Kyoto (JP)

(73) Assignee: CMIWS CO., LTD., Kyoto (JP)

( * ) Notice: Subject to any disclaimer, the term of this patent is extended or adjusted under 35 U.S.C. 154(b) by 133 days.

(21) Appl. No.: 15/577,613

(22) PCT Filed: Feb. 27, 2017

(86) PCT No.: PCT/JP2017/007582
§ 371 (c)(1),
(2) Date: Nov. 28, 2017

(87) PCT Pub. No.: WO2017/150476
PCT Pub. Date: Sep. 8, 2017

(65) Prior Publication Data
US 2018/0156641 A1 Jun. 7, 2018

(30) Foreign Application Priority Data
Mar. 1, 2016 (JP) .................. 2016-039481

(51) Int. Cl.
*G01D 5/353* (2006.01)
*G01B 11/16* (2006.01)
(Continued)

(52) U.S. Cl.
CPC ....... *G01D 5/35316* (2013.01); *G01B 5/0014* (2013.01); *G01B 11/161* (2013.01);
(Continued)

(58) Field of Classification Search
CPC .. G01D 5/35316; G01B 11/18; G01B 5/0014; G01B 11/161; G01L 11/025; G01L 1/246
See application file for complete search history.

(56) References Cited

U.S. PATENT DOCUMENTS 5,721,802 A  2/1998 Francis et al.
6,563,970 B1  5/2003 Bohnert et al.
(Continued)

FOREIGN PATENT DOCUMENTS

EP   0954743 A1   11/1999
JP   H10-073740 A   3/1998
(Continued)

OTHER PUBLICATIONS

International Search Report issued in PCT/JP2017/007582 dated May 23, 2017.
(Continued)

*Primary Examiner* — Tony Ko
(74) *Attorney, Agent, or Firm* — Studebaker & Brackett PC

(57) ABSTRACT

An optical fiber sensor according to the present invention is provided with a first fixation member which fixes an optical fiber on a base at a fixation position set on the base in a state where FBGs are arranged in one side of the fixation position and the other side of the fixation position respectively. Also, in one side of the fixation position, a second fixation member which fixes the optical fiber on the base in a state where tension is applied to a first FBG is provided. Further, in the other side of the fixation position, a third fixation member which fixes the optical fiber on the base in a state where tension which is different from the tension applied to the first FBG is applied to the second FBG and the Bragg wavelength of the second FBG is different from that of the first FBG is provided.

12 Claims, 8 Drawing Sheets

(51) Int. Cl.
 G01B 5/00 (2006.01)
 G01L 1/24 (2006.01)
 G01L 11/02 (2006.01)

(52) U.S. Cl.
 CPC .............. G01B 11/18 (2013.01); G01L 1/246 (2013.01); G01L 11/025 (2013.01)

(56) References Cited

U.S. PATENT DOCUMENTS 9,476,294 B2 * 10/2016 Harman .................. E21B 47/06
2010/0316328 A1   12/2010 Arias Vidal et al.

FOREIGN PATENT DOCUMENTS

| | | |
|---|---|---|
| JP | 2000-097786 A | 4/2000 |
| JP | 2000-221085 A | 8/2000 |
| JP | 2000-346722 A | 12/2000 |
| JP | 2005-091151 A | 4/2005 |
| JP | 2008-134155 A | 6/2008 |
| JP | 2009-222397 A | 10/2009 |
| JP | 2012-202684 A | 10/2012 |
| JP | 2012-225729 A | 11/2012 |
| WO | 98/31987 A1 | 7/1998 |

OTHER PUBLICATIONS

Written Opinion issued in PCT/JP2017/007582 dated May 23, 2017.
Extended European Search Report issued by the European Patent Office dated Mar. 18, 2019, which corresponds to EP17759942.0-1001 and is related to U.S. Appl. No. 15/577,613.

* cited by examiner

Fig. 3
(a)
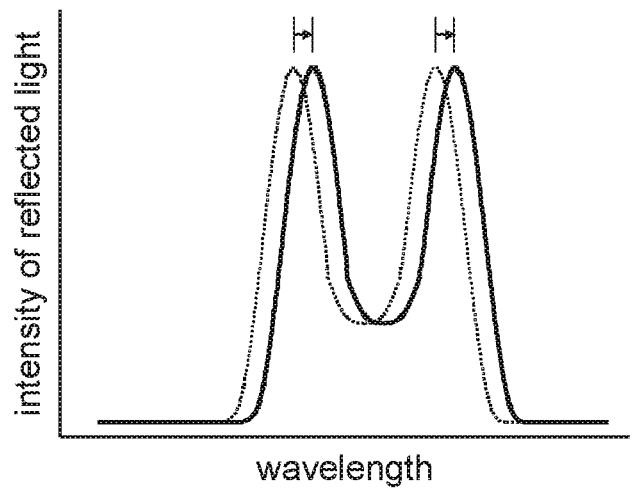
(b)
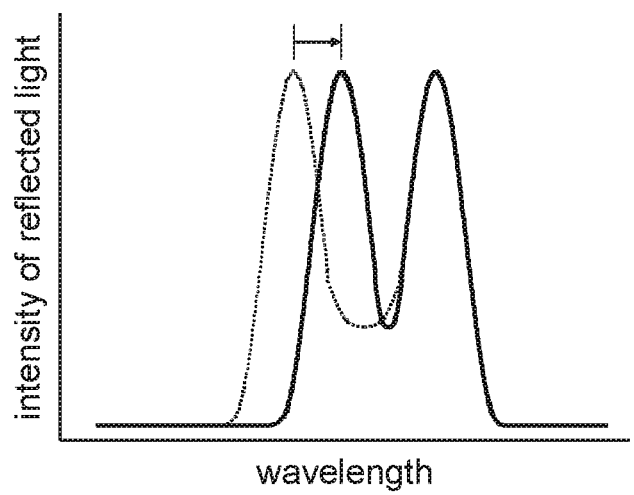
(c)
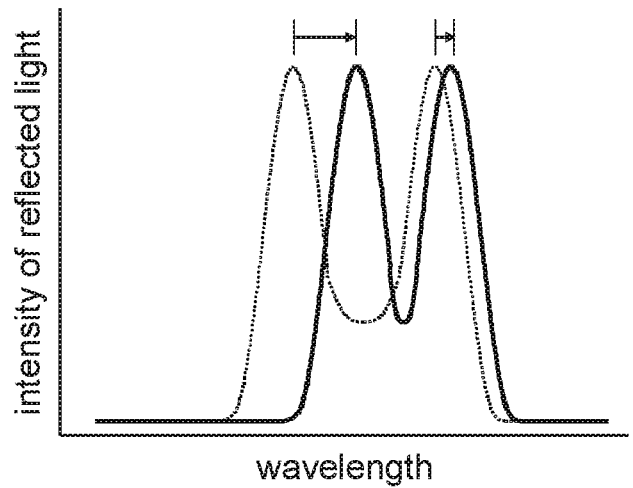

Fig. 9
(a)
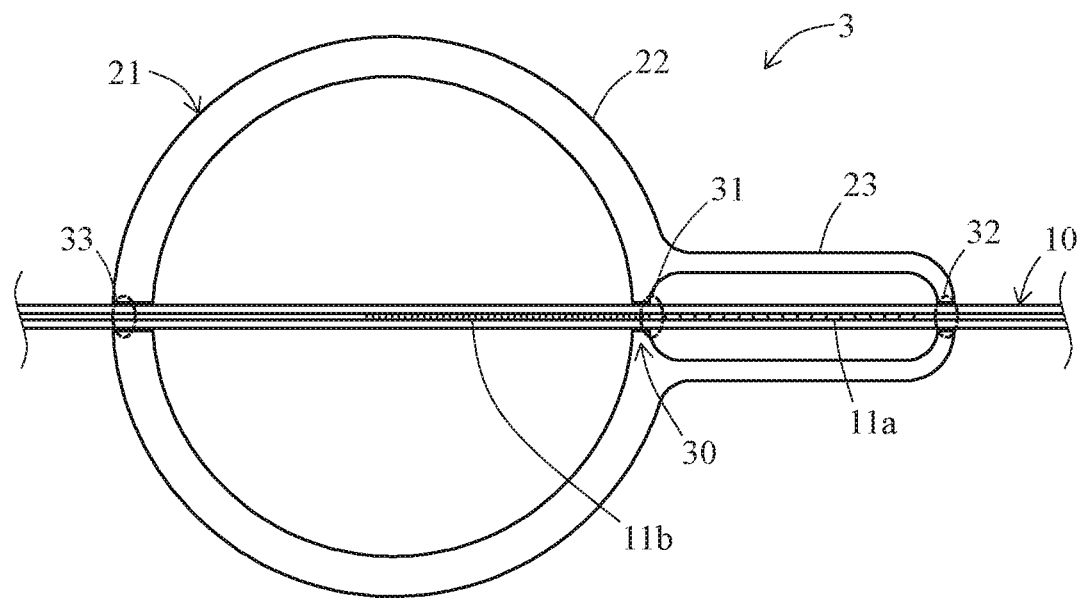
(b)
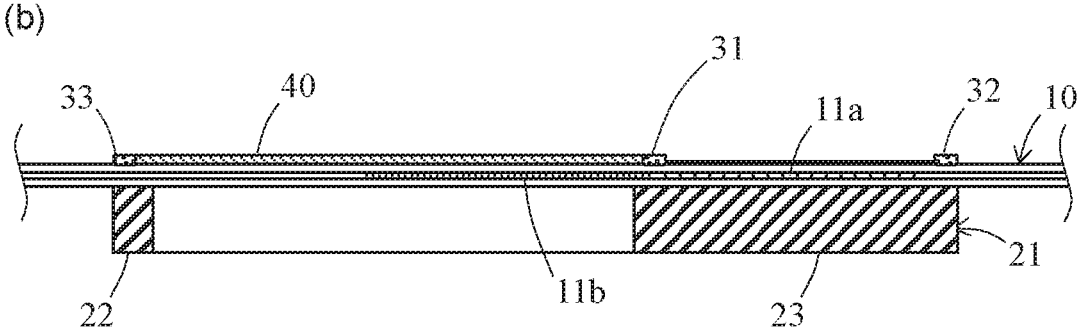

OPTICAL FIBER SENSOR

TECHNICAL FIELD

The present invention relates to an optical fiber sensor, and in particular to an optical fiber sensor having an optical fiber with a fiber Bragg grating (FBG) and a base that supports the optical fiber.

BACKGROUND ART

In recent years, optical fiber sensors using an optical fiber where a fiber Bragg grating (FBG) is formed have been used as pressure sensors or strain sensors and the like. Such optical fiber sensors measure pressure or strain amount based on a variation of a Bragg wavelength in response to a deformation of the optical fiber.

As it is publicly known, a Bragg wavelength is determined by a refractive index of an optical fiber and a grating space of diffraction grating. Thus, the Bragg wavelength varies by a variation of the refractive index caused by temperature variation, or expansion and contraction of the optical fiber as well. In other words, under temperature-uncontrolled environment, it is unable to distinguish whether the variation in the Bragg wavelength is caused by pressure or strain, or temperature variation on a measurement object. Consequently, to accurately obtain pressure or strain on the measurement object, temperature compensation for eliminating the variation of the Bragg wavelength caused by temperature variation is required.

As a method for such temperature compensation, for example, an FBG for temperature compensation is arranged to measure only the variation of the Bragg wavelength caused by temperature variation (for example, see patent documents 1 and 2). The FBG for temperature compensation is arranged adjacent to an FBG for measuring such as pressure or strain. A measurement value obtained by the FBG for measurement is corrected based on a measurement value of the FBG for temperature compensation. In this example, the FBG for measurement and the FBG for temperature compensation can be arranged either in series or in parallel.

As another method, a physical structure that suppresses a variation of a Bragg wavelength caused by temperature variation is adopted in an FBG for measuring such as pressure or strain (for example, see patent documents 3 and 4). The patent document 3 discloses a strain gauge adopting a physical structure where a thin part having spring characteristics generated by providing a void part connects two thick parts in a gauge base supporting an optical fiber. The thick parts of the gauge base are fixed on a measurement object in this structure. Expansion of the thick parts with a rise in temperature compresses the both sides of the thin parts. A dimension of each part of the gauge is designed so that the largeness of compression force can cancel the variation of the Bragg wavelength generated in an FBG for measurement. The Patent document 4 discloses a strain sensor where an FBG for measurement and measurement object to which strain is applied are fixed with a temperature compensation member therebetween. The temperature compensation member is made from a material whose coefficient of thermal expansion is a positive/negative reversed value to a coefficient of thermal expansion of an optical fiber.

Further, as another method, a patent document 5 discloses a mechanical sensor where an FBG having uniform grating spaces is adhered and fixed to a tensile member having a part which generates non-uniform strain when tension force is added. In this configuration, when the tension force is added, the grating spaces of the FBG become non-uniform and a bandwidth of reflected wave becomes widen. While, when temperature variation occurs, a Bragg wavelength varies but the bandwidth does not vary. As a result, the mechanical sensor is assumed to be able to measure strain unaffected by temperature variation by measuring the bandwidth variation.

CITATION LIST

Patent Documents

Patent document 1: Japanese Unexamined Patent Application Publication No. 2000-221085
Patent document 2: Japanese Unexamined Patent Application Publication No. 2000-346722
Patent document 3: Japanese Unexamined Patent Application Publication No. 2008-134155
Patent document 4: Japanese Unexamined Patent Application Publication No. 2012-202684
Patent document 5: Japanese Unexamined Patent Application Publication No. 2000-097786

SUMMARY OF INVENTION

Problems to be Solved by Invention

However, the conventional methods for temperature compensation as described above respectively has problems and are not satisfactory.

As disclosed in the patent document 1, in the configuration where the FBG for measurement and the FBG for temperature compensation are provided, the Bragg wavelength of the FBG for measurement and the Bragg wavelength of the FBG for temperature compensation are set in different Bragg wavelengths respectively. Thereby, each of the FBGs can specify reflected light easily. However, such configuration requires a plurality of FBGs even if the FBG for measurement and the FBG for temperature compensation are arranged in series or in parallel, thereby costs of optical fiber sensor become expensive. Since the patent document 2 discloses a technology where measurement is performed for light intensity but not for a wavelength of reflected light, the Bragg wavelength of the FBG for measurement and the Bragg wavelength of the FBG for temperature compensation become equal. However, even when the Bragg wavelengths are equal, two FBGs need to be formed on the optical fiber so that the cost of optical fiber sensor remains expensive.

As it is publicly known, a widely used processing method for forming an FBG on an optical fiber is to expose the optical fiber to ultraviolet light through a mask. A plurality of grooves is periodically formed on a surface of the mask facing the optical fiber, and ultraviolet light forms periodic interference fringes (variations in light intensity) on the optical fiber whose period is determined by the period of groove. This processing method with use of the interference fringe generates a change in a periodic refractive index in the optical fiber core. One type of mask is used as such mask is very expensive. When the FBGs with different Bragg wavelengths are formed, a method where the optical fiber is exposed in a state of being extended in an axial direction with tension applied is used as well.

According to the above processing method, since it is difficult that FBGs with different Bragg wavelengths are formed closely on the same optical fiber, the FBG for measurement is formed in a state of being some tens of mm apart from the FBG for temperature compensation. Thus, the optical fiber sensor provided with the FBG for measurement and the FBG for temperature compensation has difficulty in downsizing. Even when the optical fiber sensor has a structure where the FBG for measurement and the FBG for temperature compensation are formed on different optical fibers, two optical fibers are required, and thus the optical fiber sensor has difficulty in downsizing.

Additionally, in an aspect of measurement accuracy, it is preferable that the FBG for measurement and the FBG for temperature compensation are adjacently arranged. For example, when an object measurement of the optical fiber sensor has a rigid body with temperature distribution (for example, a concrete wall), if the FBG for measurement is formed in a state of being some tens of mm apart from the FBG for temperature compensation, temperature differences between these FBGs occur. That may generate an extremely large error at a measurement value (a strain value). When the FBG for measurement and the FBG for temperature compensation are formed on different optical fibers, it is relatively easier to arrange the FBG for measurement and the FBG for temperature compensation adjacently. Even when the FBG for measurement and the FBG for temperature compensation are formed on one optical fiber, if both FBGs are largely apart, the FBG for measurement and the FBG for temperature compensation can be arranged adjacently by bending the optical fiber. However achievement of downsizing is difficult due to a presence of the optical fiber between the FBG for measurement and the FBG for temperature compensation or the presence of the two optical fibers in these structures.

The FBGs with different Bragg wavelengths can be formed adjacently on the same optical fiber by using a plurality of masks corresponding to desired Bragg wavelengths in processing the optical fiber. However, such method requires preparation of an expensive mask for each desired Bragg wavelength, thereby the cost of the optical fiber becomes more expensive.

Meanwhile, when the configuration where the physical structure suppresses the variation of the Bragg wavelength caused by temperature variation as disclosed in the patent documents 3 and 4 is adopted, for example, the physical structure is designed by using a standard coefficient thermal expansion. However, such coefficient thermal expansion is obtained from a pure material, and it is easily presumable that a coefficient thermal expansion of a commercially available mass-produced material does not completely coincide with the standard coefficient thermal expansion. In other words, since this type of the optical fiber sensor has an individual difference in the coefficient of thermal expansion, temperature compensation of the uniformed physical structure is likely to generate variations in accuracy of the temperature compensation. Also, since the coefficient of thermal expansion itself has temperature dependence, the coefficient of thermal expansion can only be used within a limited range where the coefficient of thermal expansion is deemed to be fixed on the temperature compensation using the physical structure. Thus, this configuration requires an optical fiber sensor for every temperature of a measurement object. Further, on the temperature compensation using the physical structure, time is needed for deformation of the physical structure responding to the temperature variations. Thus, that prevents from responding to the temperature variation in a short time.

The technology disclosed in the patent document 5 requires detecting a bandwidth variation. Thus, a user who has conventionally measured pressure or strain by detecting the Bragg wavelength (peak wavelength) of reflective wave by using such as a measuring instrument needs to introduce another measuring instrument to detect the bandwidth of reflective wave.

The present invention is designed in view of such conventional arts, and an objective of the present invention is to provide an optical fiber sensor which allows FBGs with different Bragg wavelengths to be arranged extremely adjacent to one another on one optical fiber. Another objective is to provide a downsized optical fiber sensor capable of compensating temperature by using such structure.

Solution to Problem

The present invention adopts following technical methods to attain the above-described objectives. First, the present invention is based on an optical fiber sensor having an optical fiber and a base supporting the optical fiber. The optical fiber sensor in accordance with the present invention includes a first fixation member configured to fix the optical fiber on the base at a fixation position set on an installation surface for the optical fiber on the base in a state where a fiber Bragg grating (FBG) is arranged in the optical fiber in one side of the fixation position and the optical fiber sensor in the other side of the fixation position respectively. Further, the optical fiber sensor includes a second fixation member configured to fix the optical fiber on the base in one side of the fixation position in a state where tension is applied to a first FBG which is the FBG of the optical fiber in the one side of the fixation position. Further, the optical fiber sensor includes a third fixation member configured to fix the optical fiber on the base at the other side of the fixation position in a state where tension different from the tension for the first FBG is applied to a second FBG which is the FBG of the optical fiber in the other side of the fixation position and in a state where a Bragg wavelength of the second FBG is different from a Bragg wavelength of the first FBG.

In the optical fiber sensor of the present invention, the optical fiber is fixed on the base in a state where tension applied to the first FBG of the optical fiber in one side of the fixation position and tension applied to the second FBG of the optical fiber in the other side of the fixation position are different. Thus, for example, when the Bragg wavelength of the first FBG without tension applied and the Bragg wavelength of the second FBG without tension applied are equal, the Bragg wavelengths of the FBGs are respectively adjusted to desired Bragg wavelengths. Such adjustment allows to realize relatively easily to a downsized optical fiber sensor where the FBGs with the different Bragg wavelengths are arranged extremely adjacent to one another in one optical fiber.

For example, in this optical fiber sensor, a structure where the optical fiber includes one FBG having a single Bragg wavelength can be adopted. In this structure, a part of the one FBG constitutes the first FBG and another part of the one FBG constitutes the second FBG. Also, a structure where the optical fiber includes two FBGs having the equal Bragg wavelengths can be adopted. In this structure, ether one of the two FBGs constitutes the first FBG and the other of the two FBGs constitutes the second FBG.

Further, in the above optical fiber sensor, a structure where, based on previously obtained temperature dependence of the Bragg wavelength of the first FBG and previously obtained temperature dependence of the Bragg wavelength of the second FBG, temperature compensation with respect to a variation of the Bragg wavelength of either one of the FBGs is performed can be adopted. That allows to realize a downsized optical fiber sensor capable of temperature compensation.

Further, in the above optical fiber sensor, a structure where the base includes a diaphragm for pressure detection, ether one of the first FBG and the second FBG is arranged in contact with the diaphragm, and the other FBG is arranged at a position which is different from a position on the diaphragm can be adopted. Also, in the above optical fiber sensor, a structure where the base includes a first base and a second base which are configured to be capable of independently moving one another, and either one of the first FBG and the second FBG is arranged on the first base and at least a part of the other FBG is arranged between the first base and the second base can be adopted.

Effects of Invention

The present invention allows to realize relatively easily a downsized optical fiber sensor where the FBGs with the different Bragg wavelengths are arranged extremely adjacent to one another in one optical fiber. Also, a downsized optical fiber which enables temperature compensation with use of above structure can be realized.

BRIEF DESCRIPTION OF DRAWINGS

FIGS. 3 (a) to (c) are diagrams showing examples of spectrum variations of reflected light of the optical fiber sensor in accordance with an embodiment of the present invention.

FIGS. 9 (a) and (b) are diagrams showing an example of a pressure sensor in accordance with an embodiment of the present invention.

DESCRIPTION OF EMBODIMENTS

Embodiments of the present invention are described in detail hereinafter with reference to the drawings. First, a basic structure of an optical fiber sensor in accordance with the present invention is described. According to this basic structure, the optical fiber sensor is configured by one optical fiber which is fixed on a base.

Figure 1:
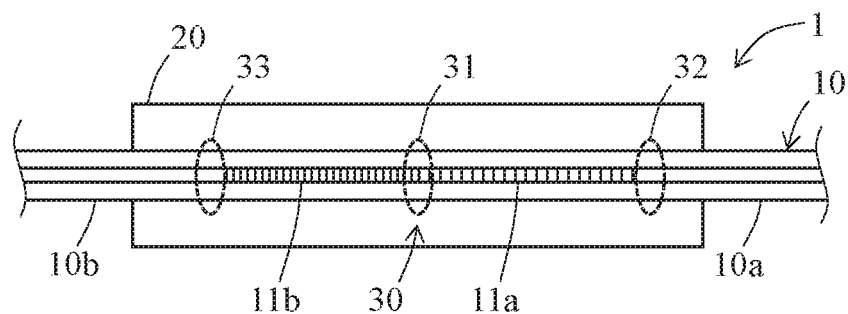
FIGS. 1 (a) and (b) are schematic structural views showing an example of a basic structure of an optical fiber sensor in accordance with an embodiment of the present invention.

FIGS. 1 (a) and (b) are schematic structural views showing an example of the basic structure of the optical fiber sensor in accordance with this embodiment. FIG. 1 (a) is a schematic view showing an installation surface of a base for an optical fiber. FIG. 1 (b) is a schematic view showing the optical fiber before being fixed to the base. In this example, the optical fiber has a structure where a core which propagates light and a cladding which surrounds a periphery of the core and reflects propagating light in the core to the core side are arranged in order from the center. In FIGS. 1 (a) and (b), the optical fiber is schematically shown as the core and the cladding arranged in the periphery of the core.

As shown in FIG. 1 (a), the optical fiber sensor 1 is provided with an optical fiber 10, a base 20, a first fixation member 31, a second fixation member 32 and a third fixation member 33. Only outer shapes of the first fixation member 31, the second fixation member 32 and the third fixation member 33 are shown by broken lines in the diagram.

The first fixation member 31 fixes the optical fiber 10 on the base 20 at a fixation position 30 which is set on the installation surface of the base 20. Here, the optical fiber 10 is fixed on the base 20 in a state where a fiber Bragg grating (FBG) is arranged in one side of the fixation position 30 of the optical fiber 10 (hereinafter referred to as an optical fiber 10a) and the other side of the fixation position 30 of the optical fiber 10 (hereinafter referred to as an optical fiber 10b) respectively. For example, an ultraviolet curing adhesive can be used for the first fixation member 31, but not especially limited thereto. Herein, the ultraviolet curing adhesive applied like a spot is used as the fixation member 31.

As shown in FIG. 1 (b), one FBG 11 having a single Bragg wavelength is formed in the optical fiber 10 and, in this example, substantially center thereof is fixed to the fixation position 30. Thus, the FBG 11 is arranged in one side of the fixation position 30 and the other side of the fixation position 30 respectively. Hereinafter, the FBG 11 in one side of the fixation position 30 is referred to as a first FBG 11a. Also, the FBG 11 on the other side of the fixation position 30 is referred to as a second FBG 11b. The FBG is illustrated by straight lines at equal intervals in the core in the FIGS. 1 (a) and (b) for convenience. Also, the intervals of the straight lines schematically show tension applied to the FBG.

The second fixation member 32 fixes the optical fiber 10 on the base 20 in a state where tension (pre-tension) is applied to the first FBG 11a which is in one side of the fixation position 30 and is the FBG in the optical fiber 10a being in one side of the fixation position 30. As shown in FIG. 1 (a), herein, the first fixation member 31 and the second fixation member 32 fix the both ends of the first FBG 11a on the base 20, and thereby the optical fiber 10 is fixed to the base 20, but not especially limited thereto. In this structure, for example, if the Bragg wavelength of the FBG 11 without tension applied is $\lambda 0$, the Bragg wavelength of the first FBG 11a with tension applied is to be $\lambda 1 (\lambda 1 > \lambda 0)$ unlike $\lambda 0$. For example, an ultraviolet curing adhesive may be used for the second fixation member 32, but not especially limited thereto. Herein, the ultraviolet curing adhesive which is applied like a spot is used as the fixation member 32.

The third fixation member 33 fixes the optical fiber 10 on the base 20 in a state where tension which is different from the tension applied to the first FBG 11a is applied to the second FBG 11b which is the FBG in the optical fiber 10b being in the other side of the fixation position 30. As shown in FIG. 1 (a), herein, the first fixation member 31 and the third fixation member 33 fix the both ends of the second FBG 11b on the base 20, and thereby the optical fiber 10 is fixed to the base 20, but not especially limited thereto. In this structure, if the tension in the second FBG 11b is smaller than the tension in the first FBG 11a, the Bragg wavelength of the second FBG 11b with tension applied is to be $\lambda 2 (\lambda 1 > \lambda 2 > \lambda 0)$ unlike $\lambda 1$. For example, an ultraviolet curing adhesive may be used for the third fixation member 33, but not especially limited thereto. Herein, the ultraviolet curing adhesive which is applied like a spot is used as the fixation member 33.

Although the state where the tension is applied to the second FBG 11b is exemplified as an especially preferred embodiment herein, the tension in the second FBG 11b may be different from the tension applied to the first FBG 11a. In other words, "tension which is different from the tension in the first FBG" is applied to the second FBG 11b in the present invention includes zero tension. In this case, the Bragg wavelength of the second FBG 11b is to be $\lambda 0$.

Figure 2:
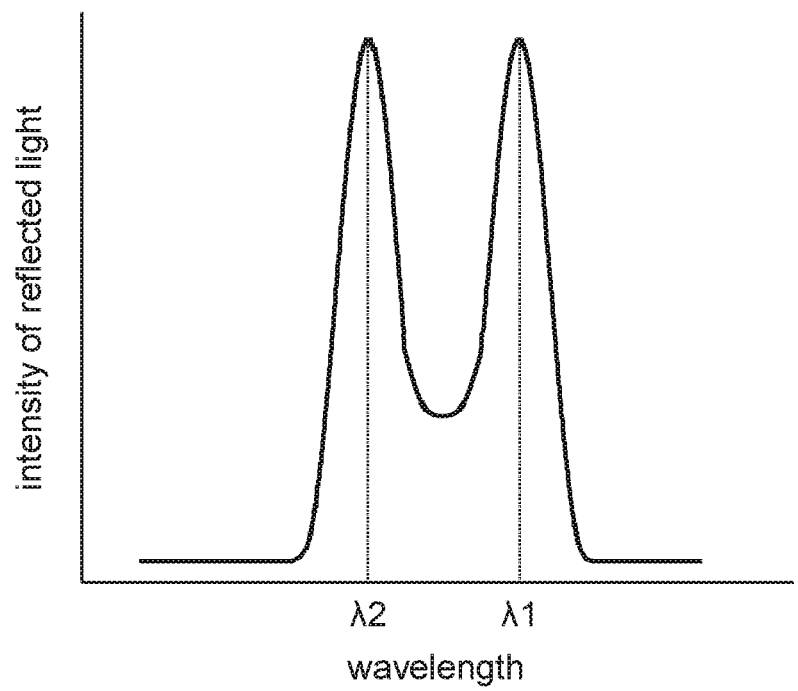
FIG. 2 is a diagram showing an example of a spectrum of reflected light of the optical fiber sensor in accordance with an embodiment of the present invention.

FIG. 2 is a diagram showing a spectrum of reflected light when wide-bandwidth light including the Bragg wavelength of the first FBG 11a and the Bragg wavelength of the second FBG 11b is entered in the optical fiber 10 of above-described optical fiber sensor 1 (hereinafter, referred to as the spectrum of reflected light). A horizontal axis corresponds to a wavelength of reflected light and a vertical axis corresponds to an intensity of reflected light in FIG. 2. As shown in FIG. 2, the spectrum of reflected light has peaks at $\lambda 1$ for the Bragg wavelength of the first FBG 11a and $\lambda 2$ for the Bragg wavelength of the second FBG 11b respectively.

The following describes the above change in the spectrum of reflected light. Here, the case where the first FBG 11a functions as an FBG for temperature compensation and the second FBG 11b functions as an FBG for pressure measurement is exemplified. For example, when the optical fiber sensor 1 is a pressure sensor having a diaphragm for pressure detection, this state corresponds to a state where the first FBG 11a is arranged at a position which is different from the diaphragm and the second FBG 11b is arranged in contact with the diaphragm.

The FIGS. 3 (a) to (c) are diagrams showing examples of the above-described spectrum of reflected light when temperature variations or pressure variations are generated. The FIG. 3 (a) is a schematic view showing a change in the spectrum of reflected light when only temperature variations (temperature rises) are generated to the optical fiber sensor 1 in a state where pressure applied to the diaphragm is unchanged. The FIG. 3 (b) is a schematic view showing a change in the spectrum of reflected light when only pressure variations (pressure rises) applied to the diaphragm are generated at fixed temperature. The FIG. 3 (c) is a schematic view showing a change in the spectrum of reflected light when temperature variations (temperature rises) and a variation in pressure (pressure rise) applied to a diaphragm are generated simultaneously in the optical fiber sensor 1. In FIGS. 3 (a) to (c), the spectrums of reflected light before the variations are shown by broken lines.

As shown in FIG. 3 (a), when only temperature variations are generated, refractive index variations and expansion are generated due to the temperature variations in both the first FBG 11a for temperature compensation and the second FBG 11b for pressure measurement. Thus, the Bragg wavelengths of the both FBGs 11a and 11b shift in a direction where the Bragg wavelengths become larger. As shown in FIG. 3 (b), when only the pressure variations are generated, the Bragg wavelength of the second FBG 11b for pressure measurement shifts in a direction where the wavelength becomes larger responding to deformation of the diaphragm accompanied with the pressure variations. At this time, the first FBG 11a for temperature compensation is unchanged, and thus the Bragg wavelength of the first FBG 11a is unchanged.

In case that both the temperature variations and the pressure variations are generated, that leads to a state where the above variations are combined. In other words, as shown in FIG. 3 (c), only the wavelength shift responding to the temperature variations is generated in the Bragg wavelength of the first FBG 11a, and the wavelength shift responding to the temperature variations and the pressure variations are simultaneously generated in the Bragg wavelength of the second FBG 11b.

For example, when the Bragg wavelength shift amount in the first FBG 11a is 0.1 nm and the Bragg wavelength shift amount in the second FBG 11b is 0.6 nm in FIG. 3 (c), and suppose the wavelength shift amount only by the temperature variations in the first FBG 11a is the same as that in the second FBG 11b in FIG. 3 (a), 0.6 nm−0.1 nm=0.5 nm is the Bragg wavelength shift amount in FIG. 3 (b) generated only by the pressure variations. The Bragg wavelength shift amount in the first FBG 11a and the Bragg wavelength shift amount in the second FBG 11b are measured in this manner, thereby the temperature compensation can be realized.

However, more strictly speaking, the Bragg wavelength shift amount in the first FBG 11a generated only by the temperature variations does not completely coincide with the Bragg wavelength shift amount in the second FBG 11b generated only by the temperature variations as shown in FIG. 3 (a). That is attributed to differences in fixed states of the optical fiber 10 (for example, temperature dependence of the Bragg wavelength from an amount or a fixation width of each fixation member 31, 32 and 33) in the first FBG 11a and the second FBG 11b, or a difference in an intensity of the tension applied to the first FBG 11a and the second FBG 11b.

Figure 4:
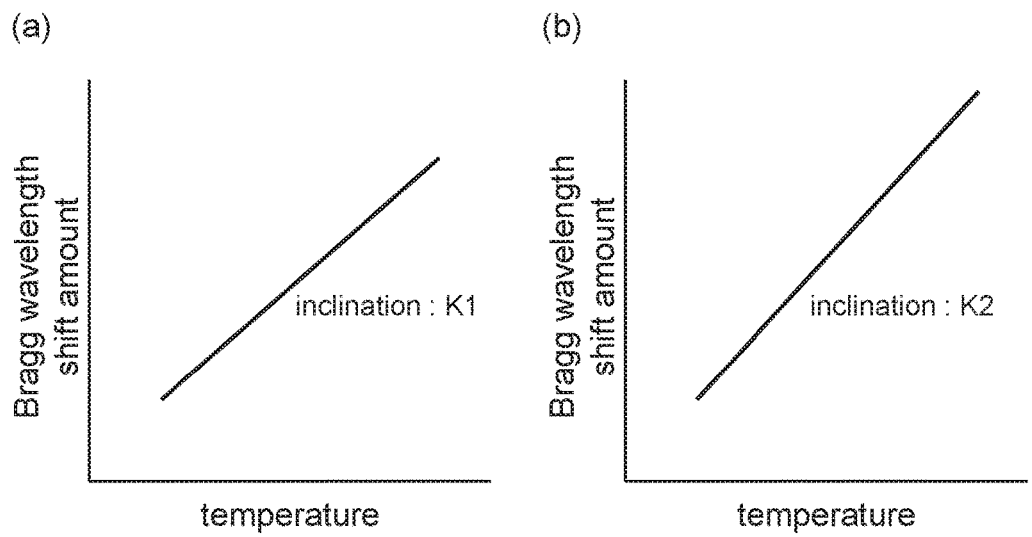
FIGS. 4 (a) and (b) are diagrams showing examples of temperature dependence of the Bragg wavelengths of the optical fiber sensor in accordance with an embodiment of the present invention.

The FIGS. 4 (a) and (b) are diagrams showing examples of temperature dependence of the Bragg wavelengths of the first FBG and the second FBG. FIG. 4 (a) is a diagram showing the temperature dependence of the first FBG 11a for the temperature compensation, and FIG. 4 (b) is a diagram showing the temperature dependence of the second FBG 11b for the pressure measurement. A horizontal axis corresponds to temperature and a vertical axis corresponds to the Bragg wavelength shift amount in FIGS. 4 (a) and (b).

As shown in FIGS. 4 (a) and (b), both of the Bragg wavelengths of the FBGs have high linearity to temperature variations. Also, it can be understood that a variation amount of the Bragg wavelength to temperature variations (or, the Bragg wavelength shift amount per unit temperature change) in the first FBG 11a is different from that in the second FBG 11b.

In this manner, the Bragg wavelength shift amounts are different between the first FBG 11a and the second FBG 11b when the temperature variations are generated in the optical fiber sensor 1, thereby temperature compensation is implemented in accordance with an expression (1) below in this embodiment.

$$(\Delta\lambda 2 - \Delta\lambda 1 \times K2/K1) \times A \tag{1}$$

In the expression (1), a difference $\Delta\lambda 1$ is the Bragg wavelength shift amount of the FBG (herein, the first FBG 11a) for temperature compensation. A difference $\Delta\lambda 2$ is the Bragg wavelength shift amount of the FBG (herein, the second FBG 11b) for pressure measurement. A constant K1 is the Bragg wavelength variation amount to the temperature variation of the FBG for temperature compensation (or, an inclination of temperature dependence shown in FIG. 4 (a)). A constant K2 is the Bragg wavelength variation amount to the temperature variation of the FBG for pressure measurement (or, an inclination of temperature dependence shown in FIG. 4 (b)). A constant A is a coefficient for converting the Bragg wavelength shift amount into a value responding to a measurement object. Herein, the constant A is a constant for converting the Bragg wavelength shift amount into a pressure value.

As described above, because of the fixed state of the optical fiber 10 or the intensity of tension applied to the first FBG 11a and the second FBG 11b, with respect to the Bragg wavelength variation amount to the temperature variation of the FBGs, an individual difference is generated in every optical fiber sensor 1. The constants K1 and K2 can be easily obtained by measuring the Bragg wavelength shift amount of each of the FBGs 11a and 11b while changing ambient temperature within such as a thermostatic chamber. Therefore, temperature compensation reflecting the individual difference of the optical fiber sensor 1 can be implemented by using the constants K1 and K2 obtained in every optical fiber sensor 1 and by compensating temperature with the expression (1). As a result, implementation of temperature compensation with extremely high accuracy is possible.

Figure 5:
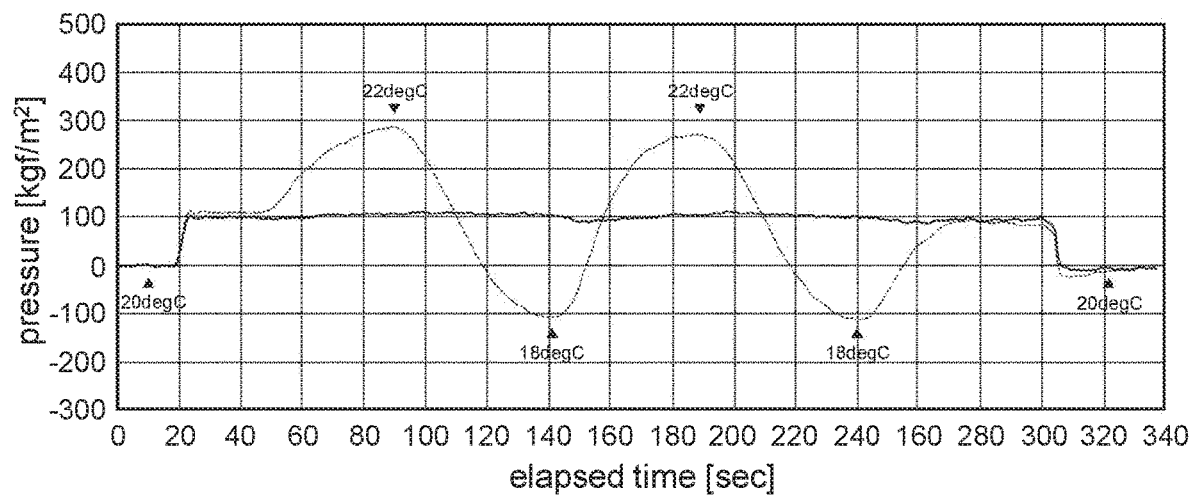
FIG. 5 is a diagram showing a specific example of temperature compensation by the optical fiber sensor in accordance with an embodiment of the present invention.

FIG. 5 is a diagram showing a specific example of temperature compensation in the pressure sensor, which is the optical fiber sensor 1 in this embodiment. Herein, pressure values are exemplified when water temperature is changed in the range from 18 to 22 degrees Celsius in a state where the above-described pressure sensor is arranged at water depth of 10 cm. A horizontal axis corresponds to passage of time and a vertical axis corresponds to a pressure value in FIG. 5. Also, pressure values for which temperature is compensated in accordance with the expression (1) are shown by a solid line, and pressure values without temperature compensation which are yielded by multiplying the Bragg wavelength shift amount of the FBG arranged in contact with the diaphragm by the above-described coefficient A is shown by a broken line in FIG. 5. The pressure sensor is kept at the water depth of 10 cm within the range of 20 to 300-odd seconds of passage of time.

It can be understood from the FIG. 5 that the pressure values without temperature compensation greatly fluctuate in response to the temperature variations. On the contrary, it can be understood that the pressure values for which temperature is compensated show 100 kg f/m² accurately, which is a pressure value at water depth of 10 cm.

Figure 6:
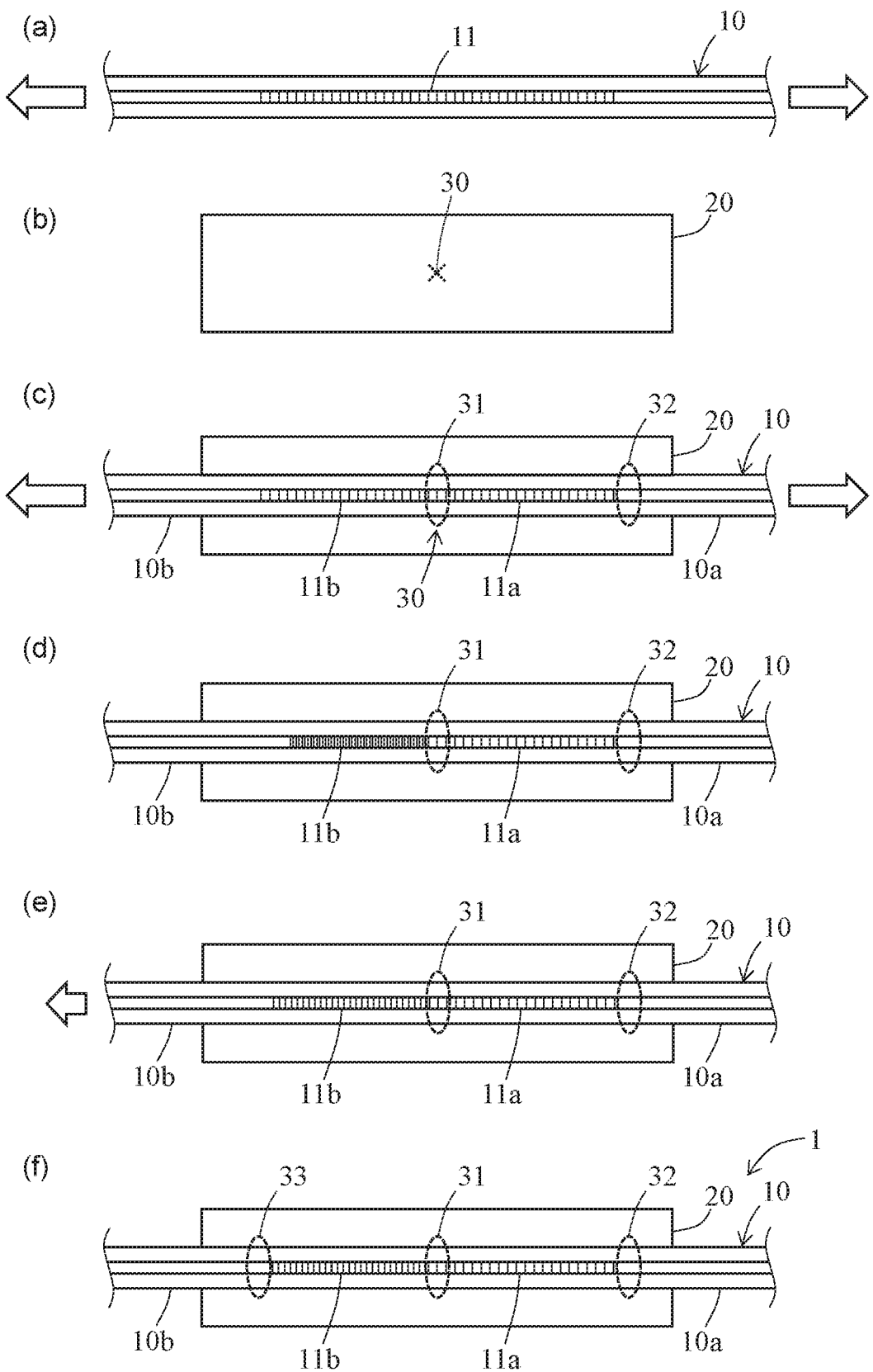
FIGS. 6 (a) to (f) are diagrams showing an assembly procedure of the optical fiber sensor in accordance with an embodiment of the present invention.

Next, an assembly procedure of the optical fiber sensor 1 is described. FIGS. 6 (a) to (f) are diagrams showing an example of an assembly procedure of the optical fiber sensor 1 in accordance with this embodiment. First, as shown in FIG. 6 (a), tension is applied to the optical fiber 10 having a single Bragg wavelength, and the FBG 11 is extended along axis direction.

Subsequently, as shown in FIGS. 6 (b) and (c), the optical fiber 10 with tension applied is arranged on the installation surface for optical fiber of the base 20 in a state where a part of the optical fiber 10 fixed to the fixation position 30 (herein, a center of the FBG 11) is being aligned. At this time, the Bragg wavelength of the first FBG 11a can be adjusted to a desired wavelength relatively easily by adjusting the tension applied to the optical fiber 10. As shown in FIG. 6 (c), in this state, the optical fiber 10 is adhered and fixed to the base 20 with the first fixation member 31 at the fixation position 30. Also, the optical fiber 10 is adhered and fixed to the base 20 with the second fixation member 32 at a position on the opposite side of the fixation position 30 with the first FBG 11a therebetween.

As shown in FIG. 6 (d), on completion of fixing the optical fiber 10 with the first fixation member 31 and the second fixation member 32, the tension applied to the optical fiber 10 is released. Subsequently, as shown in FIG. 6 (e), tension which is different from tension applied to the first FBG 11a is applied to the second FBG 11b, and the second FBG 11b is extended in the axis direction of the optical fiber 10. At this time, the Bragg wavelength of the second FBG 11b can be adjusted to a desired wavelength by adjusting the tension applied to the second FBG 11b.

As shown in FIG. 6 (f), in this state, the optical fiber 10 is adhered and fixed to the base 20 with the third fixation member 33 at a position on the opposite side of the fixation position 30 with the second FBG 11b therebetween.

The optical fiber sensor 1 is assembled in that manner, and, for example, the rear surface of the installation surface thereof is fixed on a measurement object. Any publicly-known optional method can be used for fixing the optical fiber sensor 1 on the measurement object. For example, an ultraviolet curing adhesive can be used for fixing the optical fiber sensor 1 on the measurement object.

As described above, in accordance with the optical fiber sensor 1 in this embodiment, the optical fiber 10 is fixed on the base 20 in the state where the tension applied to the first FBG 11a and the tension applied to the second FBG 11b are different. Thus, even when the Bragg wavelength of the first FBG 11a without tension applied and the Bragg wavelength of the second FBG 11b without tension applied are equal, the Bragg wavelengths of the FBGs 11a and 11b are respectively adjusted to the desired Bragg wavelengths. Such adjustment allows to realize relatively easily a downsized optical fiber sensor 1 in the state where the FBGs 11a and 11b with the different Bragg wavelengths are arranged extremely adjacent to one another on one optical fiber 10.

Also, when the first FBG 11a and the second FBG 11b are configured by one FBG 11 having a single Bragg wavelength formed on the optical fiber 10 as described above, a manufacturing cost can be extremely low because the FBG 11 formed on the optical fiber 10 is one FBG.

Further, if a structure where, based on previously obtained temperature dependence of the Bragg wavelength of the first FBG 11a and previously obtained temperature dependence of the Bragg wavelength of the second FBG 11b, temperature is compensated on either one of the variations of the Bragg wavelengths of the FBGs in the optical fiber sensor 1 is adopted, this structure allows to realize a downsized optical fiber sensor 1 capable of temperature compensation.

Furthermore, since the Bragg wavelength of the first FBG 11a and the previously obtained Bragg wavelength of the second FBG 11b are different, every movement of peak may be tracked while measuring strain or pressure in the case of obtaining temperature dependence of the Bragg wavelength. Thus, the variation of the Bragg wavelength can be easily measured by using the conventional method.

In the above, the first FBG 11a and the second FBG 11b are formed from the optical fiber 10 having one FBG with a single Bragg wavelength. The FBG also exists between the first FBG 11a and the second FBG 11b (or, just under the first fixation member 31) in this structure. Thus, as shown in FIG. 2, the intensity of reflected light between the two Bragg wavelengths becomes larger in the spectrum of reflected light. In an aspect of making larger dynamic range of peak detection of the Bragg wavelength, the intensity of reflected light between the two Bragg wavelengths is preferably lower.

Figure 7:
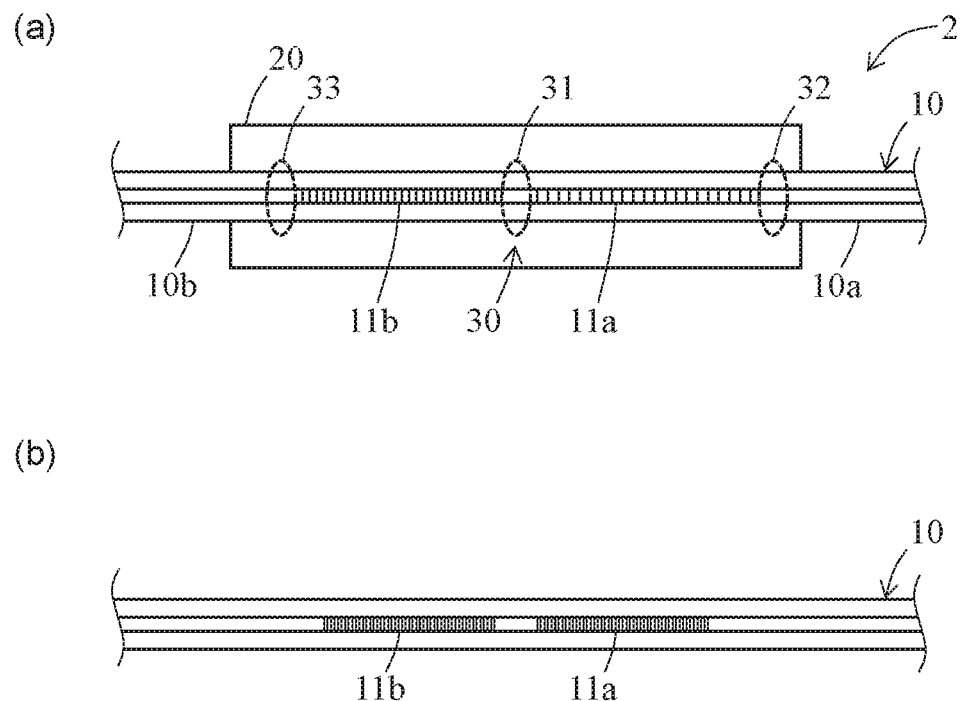
FIGS. 7 (a) and (b) are schematic structural views showing another example of a basic structure of an optical fiber sensor in accordance with an embodiment of the present invention.

FIGS. 7 (a) and (b) are schematic structural views showing an example of another basic structure of an optical fiber sensor in accordance with this embodiment. FIG. 7 (a) is a schematic view showing an installation surface of a base for an optical fiber. FIG. 7 (b) is a schematic view showing the optical fiber before being fixed to the base.

As shown in FIG. 7 (b), a first FBG 11a and a second FBG 11b are formed with a predetermined interval on an optical fiber 10 in this optical fiber sensor 2 and have the same Bragg wavelength. As shown in FIG. 7 (a), the optical fiber 10 between the first FBG 11a and the second FBG 11b is fixed at a fixation position 30. Other structures are the same as the above-described optical fiber sensor 1.

Figure 8:
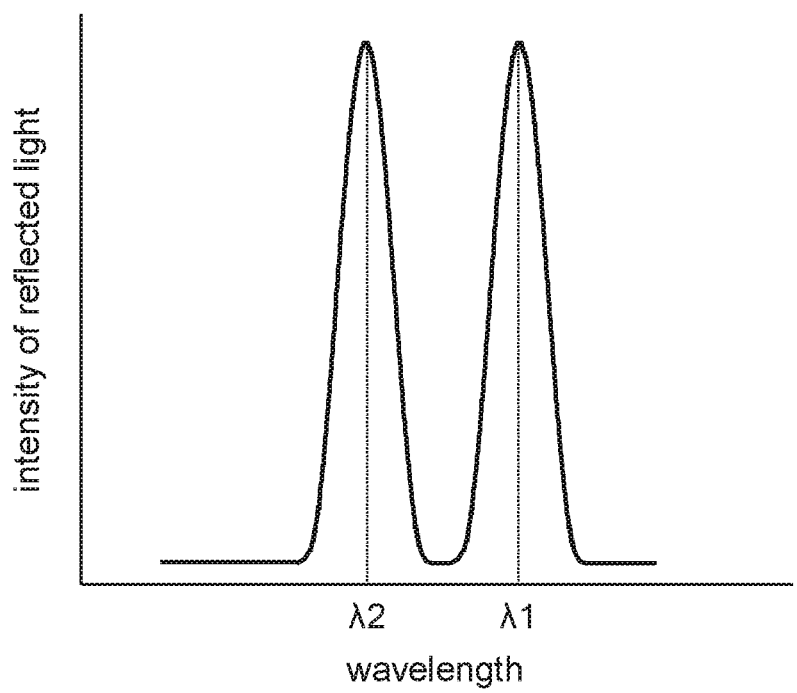
FIG. 8 is a diagram showing an example of a spectrum of reflected light of the optical fiber sensor in accordance with an embodiment of the present invention.

FIG. 8 is a diagram showing a spectrum of reflected light when wide-bandwidth light including the Bragg wavelength of the first FBG 11a and the Bragg wavelength of the second FBG 11b is entered in the optical fiber 10 of the above-described optical fiber sensor 2. A horizontal axis corresponds to a wavelength of reflected light and a vertical axis corresponds to an intensity of reflected light in FIG. 8.

As shown in FIG. 8, as with the optical fiber sensor 1, the spectrum of reflected light has peaks at λ1 for the Bragg wavelength of the first FBG 11a and λ2 for the Bragg wavelength of the second FBG 11b respectively. Because the FBG does not exist just under the first fixation member 31 in the optical fiber sensor 2, the intensity of reflected light between the two Bragg wavelengths in the spectrum of reflected light is smaller than the intensity of reflected light of the optical fiber sensor 1 shown in FIG. 2. Therefore, dynamic range of peak detection of the Bragg wavelength can be larger in accordance with this structure, and this structure is especially suitable for connecting a plurality of the optical fiber sensors 2 in series.

The two FBGs with the same Bragg wavelengths as shown in FIG. 7 (b), for example, are formed relatively easier by arranging a light-shielding member such as a tape at a corresponding part between the first FBG 11a and the second FBG 11b on a mask which is used when one FBG 11 shown in FIG. 1 (b) is formed. According to such method, the two FBGs having the equal Bragg wavelength are formed simultaneously, thereby a manufacturing cost can be extremely low.

Examples about applications of the above-described optical fiber sensor 1 on a pressure sensor and a uniaxial strain sensor (a strain gauge) are simply described below.

FIGS. 9 (a) and (b) are diagrams showing an example of an application of the basic structure described as the optical fiber sensor 1 to a pressure sensor. FIG. 9 (a) is a schematic plan view showing the pressure sensor and FIG. 9 (b) is a schematic cross-sectional view along the optical fiber in the FIG. 9 (a). In FIG. 9 (a), an illustration of a diaphragm for pressure detection is omitted for explanation.

As shown in FIGS. 9 (a) and (b), the pressure sensor 3 is provided with an optical fiber 10, a base 21, a first fixation member 31, a second fixation member 32 and a third fixation member 33. As shown in FIG. 9 (a), the base 21 has a circular ring-shaped circular ring part 22 where a round through hole is formed which functions as a pressure measurement part and an extension part 23 which functions as a temperature measurement part, and both parts are connected. The extension part 23 is configured by a plate material with a predetermined width which is extended along a diameter direction of the circular ring part 22 in plan view. The optical fiber 10 is arranged along the extended direction of the extension part 23 in a state of passing through a center of the circular ring part 22 in plan view.

The width of the base 21 is thicker than a diameter of the optical fiber 10, and grooves for housing the optical fiber 10 are formed at arrangement positions for the optical fiber 10 on the circular ring part 22 and the extension part 23.

As shown in FIG. 9 (b), a round-shaped diaphragm 40 in plan view abuts to the optical fiber 10 which is arranged in the state of crossing the through hole in the circular ring part 22, and in that state, a circumference of the diaphragm 40 is fixed to and supported by the circular ring part 22. Thus, the optical fiber 10 is arranged between the diaphragm 40 and the base 21.

According to the above structure, a connecting point between the circular ring part 22 and the extension part 23 is the above-described fixation position 30 where the first fixation member 31 fixes the optical fiber 10 on the base 21. For example, the optical fiber 10 is fixed on the base 21 at an end part of the extension part 23 on opposite side of the fixation position 30 with the second fixation member 32. Also, the optical fiber 10 is fixed on the base 21 with the third fixation member 33 at a position in the circular ring part 22 which is opposed to the fixation position 30 with the through hole therebetween. Therefore, the above-described first FBG 11a is arranged in the extension part 23 which is in no contact with the diaphragm 40 and the above-described second FBG 11b is arranged in contact with the diaphragm 40 in the circular ring part 22 in this structure. In other words, the first FBG 11a functions as the FBG for temperature compensation and the second FBG 11b functions as the FBG for pressure measurement. As shown in FIG. 9 (a), the second FBG 11b is arranged from the fixation position 30 across the center of the circular ring part 22 (the center of the diaphragm 40) in this example. The second FBG 11b is adhered and fixed to the diaphragm 40, but not especially limited thereto.

As described above, the first FBG 11a for temperature compensation and the second FBG 11b for pressure measurement are arranged extremely adjacent to one another in the pressure sensor 3. That allows to realize the pressure sensor capable of compensating temperature with high accuracy and being downsized. Further, due to the structure where temperature variation is measured by the FBG, the pressure sensor can respond in a short time to a dynamic temperature variation where temperature varies in a short time.

Figure 10:
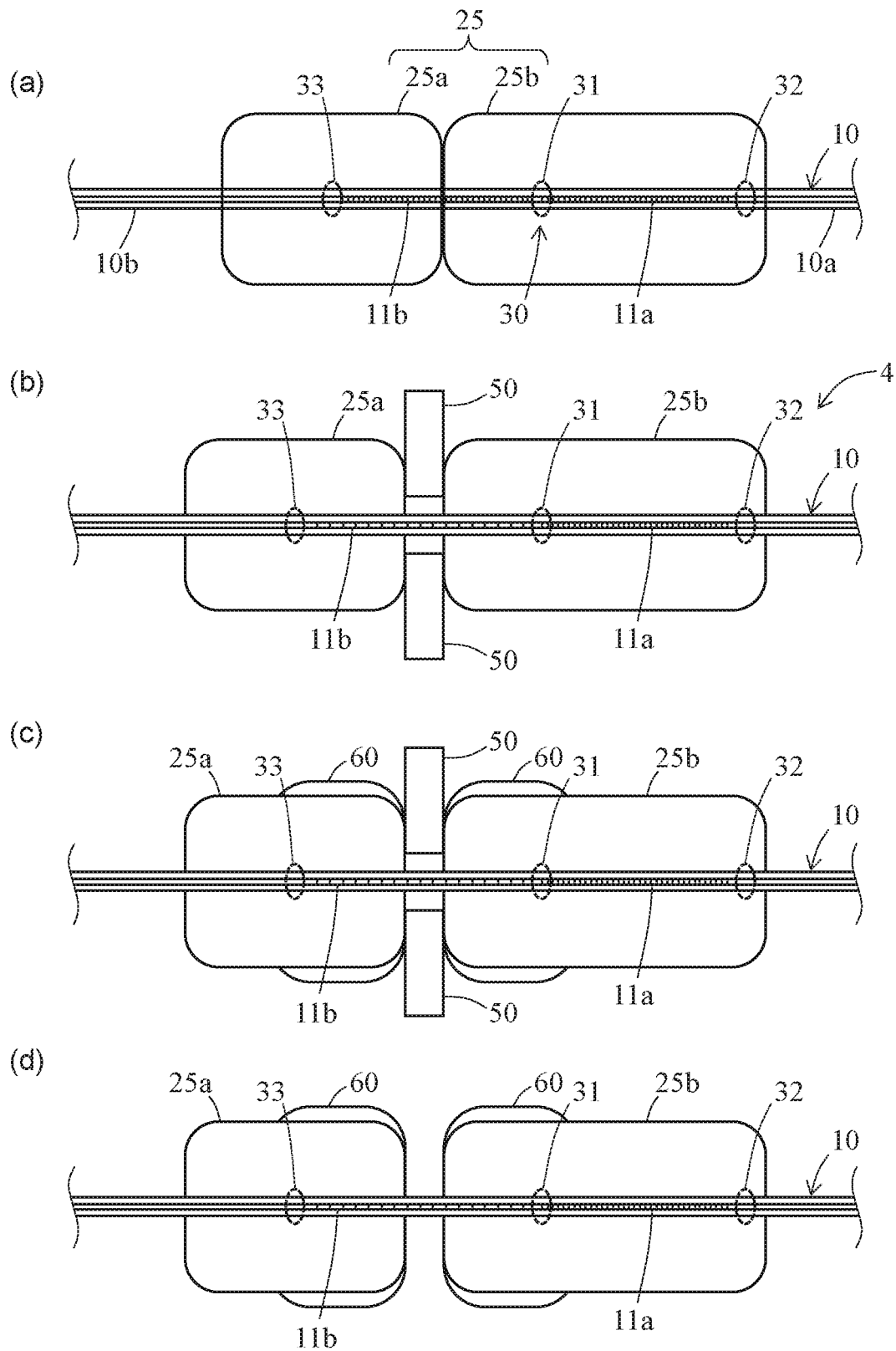
FIGS. 10 (a) to (d) are diagrams showing an example of a strain sensor in accordance with an embodiment of the present invention.

FIGS. 10 (a) to (d) are diagrams showing an example of an application of the basic structure described as the optical fiber sensor 1 to a uniaxial strain sensor 4. A structure of a strain sensor 4 together with an assembly process and an installation method is described herein.

As shown in plan view of FIG. 10 (a), the strain sensor 4 is provided with an optical fiber 10, a base 25, a first fixation member 31, a second fixation member 32, and a third fixation member 33. As shown in FIG. 10 (a), the base 25 is provided with a first base 25a and a second base 25b capable of independently moving one another. The first base 25a and the second base 25b are configured with rectangular plate members in plan view. In this example, the first FBG 11a functioning as an FBG for temperature compensation is arranged on the second base 25b, but not especially limited thereto. Thus, a length of the second base 25b along an arrangement direction of the optical fiber 10 is longer than that of the first base 25a along the arrangement direction of the optical fiber 10. At least a part of the second FBG 11b functioning as an FBG for strain measurement is arranged between the first base 25a and the second base 25b.

As shown in FIG. 10 (a), the optical fiber 10 is fixed to the first base 25a and the second base 25b in a state where the bases 25a and 25b are arranged adjacently one another. At this time, tension is applied to the optical fiber 10. In this example, the above-described fixation position 30 is set on the second base 25b, and the optical fiber 10 is fixed on the second base 25b with the first fixation member 31 at the fixation position 30. Also, the optical fiber 10 is fixed to the second base 25b with the second fixation member 32 at a position on an opposite side of the fixation position 30 with the first FBG 11a arranged on the second base 25b therebetween. Also, the optical fiber 10 is fixed to the first base 25a with the third fixation member 33 at a position on an opposite side of the fixation position 30 with the second FBG 11b arranged on the first base 25a and the second base 25b therebetween.

On completion of the fixation of the optical fiber 10 with the first fixation member 31, the second fixation member 32, and the third fixation member 33, the tension applied to the optical fiber 10 is released. Subsequently, as shown in FIG. 10 (b), the first base 25a and the second base 25b are separated along the arrangement direction of the optical fiber 10. A spacer 50 is inserted in a space between the first base 25a and the second base 25b formed by the separation. Thus, due to the separation of the first base 25a and the second base 25b, the tension applied to the second FBG 11b is larger than the tension applied to the first FBG 11a so that this state is maintained by the spacer 50. In this manner, the assembly of the strain sensor 4 is completed.

For example, a part opposing to the second FBG 11b functioning as an FBG for strain measurement among rear surfaces of the first base 25a and the second base 25b (the opposite surface of the installation surface of the optical fiber) of the strain sensor 4 assembled in the above-described manner is fixed on a measurement object. Any publicly-known optional method can be used for fixation of the strain sensor 4 on the measurement object. As shown in FIG. 10 (c), for example, an ultraviolet curing adhesive 60 can be used to fix the strain sensor 4 on the measurement object.

On completion of fixation of the strain sensor 4 on the measurement object, the spacer 50 is removed. In this structure, the tension applied to the second FBG 11b is larger than the tension applied to the first FBG 11a. Thus, with respect to a spectrum of reflected light of the strain sensor 4, unlike the examples shown in FIG. 2 and FIG. 8, a Bragg wavelength of the first FBG 11a functioning as the FBG for temperature compensation is smaller than that of the second FBG 11b functioning as the FBG for strain measurement.

As described above, the first FBG 11a for temperature compensation and the second FBG 11b for strain measurement are arranged extremely adjacent to one another in the strain sensor 4. That allows to realize the strain sensor capable of compensating temperature with high accuracy and being downsized. Further, due to the structure where temperature variation is measured by the FBG, the strain sensor can respond in a short time to a dynamic temperature variation where temperature varies in a short time.

Figure 11:
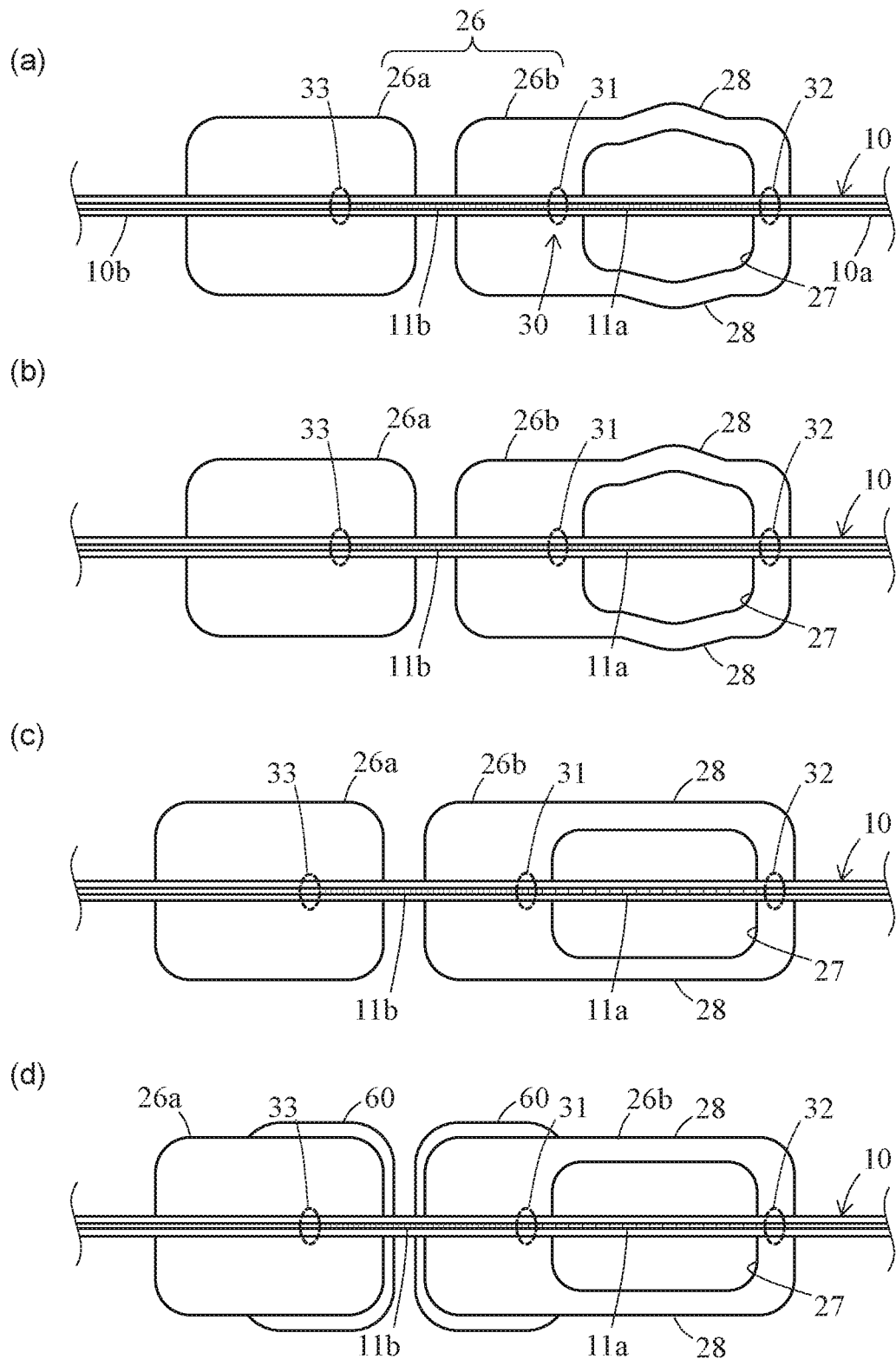
FIGS. 11 (a) to (d) are diagrams showing an example of a strain sensor in accordance with an embodiment of the present invention.

FIGS. 11 (a) to (d) are diagrams showing an example of an application of the basic structure described as the optical fiber sensor 1 to a uniaxial strain sensor 5. A structure of a strain sensor 5 together with an assembly process and an installation method is described herein.

As shown in a plan view of FIGS. 11 (a), the strain sensor 5 is provided with an optical fiber 10, a base 26, a first fixation member 31, a second fixation member 32, and a third fixation member 33. As shown in FIG. 11 (a), the base 26 is provided with a first base 26a and a second base 26b capable of independently moving one another. The first base 26a and the second base 26b are configured with rectangular plate members in plan view. In this example, the first FBG 11a functioning as an FBG for temperature compensation is arranged on the second base 26b, but not especially limited thereto. Thus, a length of the second base 26b along an arrangement direction of the optical fiber 10 is longer than that of the first base 26a along the arrangement direction of the optical fiber 10.

In this example, a substantially rectangular through hole 27 is formed on the second base 26b so that a length of the second base 26b along the arrangement direction of the optical fiber 10 can be extensible. With respect to the second base 26b where the optical fiber 10 is fixed, the length of the second base 26b along the arrangement direction of the optical fiber 10 is temporarily shortened by compressing and deforming the through hole 27. In this example, an outer periphery part 28 of the through hole 27 along the arrangement direction of the optical fiber 10 is thinner than other parts in the second base 26b. Thus, the outer periphery part 28 projects outward as shown in FIG. 11 (a) in the case of the above-described compression and deformation. In the same manner as the above-described strain sensor 4, At least a part of the second FBG 11b functioning as the FBG for strain measurement is arranged between the first base 26a and the second base 26b.

As shown in FIG. 11 (a), the optical fiber 10 is fixed to the first base 26a and the second base 26b arranged side by side with a predetermined interval. At this time, tension is applied to the optical fiber 10. In this example, the above-described fixation position 30 is set on the second base 26b, and the optical fiber 10 is fixed on the second base 26b with the first fixation member 31 at the fixation position 30. Also, the optical fiber 10 is fixed to the second base 26b with the second fixation member 32 at a position on an opposite side of the fixation position 30 with the first FBG 11a arranged across the through hole 27 of the second base 26b therebetween. Also, the optical fiber 10 is fixed to the first base 26a with the third fixation member 33 at a position on an opposite side of the fixation position 30 with the second FBG 11b arranged on the first base 26a and the second base 26b therebetween. A space between the first base 26a and the second base 26b can be made, for example, with a spacer (not shown) therebetween.

On completion of the fixation of the optical fiber 10 with the first fixation member 31, the second fixation member 32, and the third fixation member 33, the tension applied to the optical fiber 10 is released. Thereafter, the compressed and deformed through hole 27 is re-deformed to the condition before being compressed and deformed so that the length of the second base 26b along the arrangement direction of the optical fiber 10 is extended as shown in FIGS. 11 (b) and (c). Thus, the length of the second base 26b is extended, thereby tension applied to the first FBG 11a is larger than tension applied to the second FBG 11b. In this manner, the assembly of the strain sensor 5 is completed. The above-described re-deformation is realized by restoring the shape of the outer periphery part 28 projecting outward as shown in FIG. 11 (b) to the condition before being compressed and deformed.

For example, a part opposing to the second FBG 11b functioning as an FBG for strain measurement among rear surfaces of the first base 26a and the second base 26b of the strain sensor 5 assembled in the above-described manner is fixed on a measurement object. Any publicly-known optional method can be used for fixation of the strain sensor 5 on the measurement object. As shown in FIG. 11 (d), for example, an ultraviolet curing adhesive 60 can be used to fix the strain sensor 5 on the measurement object.

As described above, the first FBG 11a for temperature compensation and the second FBG 11b for strain measurement are arranged extremely adjacent to one another in the strain sensor 5. That allows to realize the strain sensor capable of compensating temperature with high accuracy and being downsized. Further, due to the structure where temperature variation is measured by the FBG, the strain sensor can respond in a short time to a dynamic temperature variation where temperature varies in a short time.

The above-described embodiments do not limit a technical scope of the present invention and enable to be modified and applied variously by methods other than described herein within the scope of the present invention. For example, in the above-described embodiment, an ultraviolet curing adhesive is exemplified as the especially preferred embodiment, however, any optional material can be used as long as the material is capable of fixing the optical fiber 10 on the base. Also, a material for the base is not especially limited and can be optionally selected responding to the measurement object.

INDUSTRIAL APPLICABILITY OF INVENTION

According to the present invention, the FBGs having different Bragg wavelengths can be arranged extremely adjacent to one another in one optical fiber, and that is useful as the optical fiber sensor.

EXPLANATION OF REFERENCE SIGNS 1, 2 optical fiber sensor
3 pressure sensor (optical fiber sensor)
4, 5 strain sensor (optical fiber sensor)
10 optical fiber
11 FBG
11a first FBG
11b second FBG
20,21,25,26 base
25a, 26a first base
25b, 26b second base
30 fixation position
31 first fixation member
32 second fixation member
33 third fixation member

The invention claimed is:

1. An optical fiber sensor provided with an optical fiber and a base supporting the optical fiber, comprising:
the optical fiber provided with a fiber Bragg grating having a single Bragg wavelength;
a first fixation member configured to be arranged on the optical fiber overlapping a position of the fiber Bragg grating and configured to fix the fiber Bragg grating of the optical fiber on the base at a fixation position set on an installation surface for the optical fiber on the base;
a second fixation member configured to fix the optical fiber on the base at the one side of the fixation position in a state where tension is applied to a first fiber Bragg grating which is a part of the fiber Bragg grating of the optical fiber in the one side of the fixation position; and
a third fixation member configured to fix the optical fiber on the base at the other side of the fixation position in a state where tension which is different from the tension for the first fiber Bragg grating is applied to a second fiber Bragg grating which is another part of the fiber Bragg grating of the optical fiber in the other side of the fixation position and in a state where a Bragg wavelength of the second fiber Bragg grating is different from a Bragg wavelength of the first fiber Bragg grating.

2. An optical fiber sensor provided with an optical fiber and a base supporting the optical fiber, comprising:
a first fixation member configured to fix the optical fiber on the base at a fixation position set on an installation surface for the optical fiber on the base in a state where a fiber Bragg grating is arranged in the optical fiber in one side of the fixation position and the optical fiber in the other side of the fixation position respectively;
a second fixation member configured to fix the optical fiber on the base at the one side of the fixation position in a state where tension is applied to a first fiber Bragg grating which is the fiber Bragg grating of the optical fiber in the one side of the fixation position; and
a third fixation member configured to fix the optical fiber on the base at the other side of the fixation position in a state where tension which is different from the tension for the first fiber Bragg grating is applied to a second fiber Bragg grating which is the fiber Bragg grating of the optical fiber in the other side of the fixation position and in a state where a Bragg wavelength of the second fiber Bragg grating is different from a Bragg wavelength of the first fiber Bragg grating, wherein,
based on previously obtained temperature dependence of the Bragg wavelength of the first fiber Bragg grating and previously obtained temperature dependence of the Bragg wavelength of the second fiber Bragg grating, temperature compensation with respect to a variation of the Bragg wavelength of either one of the fiber Bragg gratings is performed.

3. The optical fiber sensor according to claim 2, wherein the optical fiber includes one fiber Bragg grating having a single Bragg wavelength where a part of the one fiber Bragg grating constitutes the first fiber Bragg grating and another part of the one fiber Bragg grating constitutes the second fiber Bragg grating.

4. The optical fiber sensor according to claim 2, wherein the optical fiber includes two fiber Bragg gratings having equal Bragg wavelengths where either one of the two fiber Bragg gratings constitutes the first fiber Bragg grating and the other fiber Bragg grating constitutes the second fiber Bragg grating.

5. The optical fiber sensor according to claim 2, wherein the base includes a diaphragm for pressure detection, and either one of the first fiber Bragg grating and the second fiber Bragg grating is arranged in contact with the diaphragm and the other fiber Bragg grating is arranged at a position which is different from a position on the diaphragm.

6. The optical fiber sensor according to claim 2, wherein the base includes a first base and a second base which are configured to be capable of independently moving one another, and either one of the first fiber Bragg grating and the second fiber Bragg grating is arranged on the first base and at least a part of the other fiber Bragg grating is arranged between the first base and the second base.

7. An optical fiber sensor provided with an optical fiber and a base supporting the optical fiber, comprising:
a first fixation member configured to fix the optical fiber on the base at a fixation position set on an installation surface for the optical fiber on the base in a state where a fiber Bragg grating is arranged in the optical fiber in one side of the fixation position and the optical fiber in the other side of the fixation position respectively;

a second fixation member configured to fix the optical fiber on the base at the one side of the fixation position in a state where tension is applied to a first fiber Bragg grating which is the fiber Bragg grating of the optical fiber in the one side of the fixation position; and a third fixation member configured to fix the optical fiber on the base at the other side of the fixation position in a state where tension which is different from the tension for the first fiber Bragg grating is applied to a second fiber Bragg grating which is the fiber Bragg grating of the optical fiber in the other side of the fixation position and in a state where a Bragg wavelength of the second fiber Bragg grating is different from a Bragg wavelength of the first fiber Bragg grating, wherein the base includes a diaphragm for pressure detection, and either one of the first fiber Bragg grating and the second fiber Bragg grating is arranged in contact with the diaphragm and the other fiber Bragg grating is arranged at a position which is different from a position on the diaphragm.

8. The optical fiber sensor according to claim 7, wherein the optical fiber includes one fiber Bragg grating having a single Bragg wavelength where a part of the one fiber Bragg grating constitutes the first fiber Bragg grating and another part of the one fiber Bragg grating constitutes the second fiber Bragg grating.

9. The optical fiber sensor according to claim 7, wherein the optical fiber includes two fiber Bragg gratings having equal Bragg wavelengths where either one of the two fiber Bragg gratings constitutes the first fiber Bragg grating and the other fiber Bragg grating constitutes the second fiber Bragg grating.

10. An optical fiber sensor provided with an optical fiber and a base supporting the optical fiber, comprising:

a first fixation member configured to fix the optical fiber on the base at a fixation position set on an installation surface for the optical fiber on the base in a state where a fiber Bragg grating is arranged in the optical fiber in one side of the fixation position and the optical fiber in the other side of the fixation position respectively;

a second fixation member configured to fix the optical fiber on the base at the one side of the fixation position in a state where tension is applied to a first fiber Bragg grating which is the fiber Bragg grating of the optical fiber in the one side of the fixation position; and a third fixation member configured to fix the optical fiber on the base at the other side of the fixation position in a state where tension which is different from the tension for the first fiber Bragg grating is applied to a second fiber Bragg grating which is the fiber Bragg grating of the optical fiber in the other side of the fixation position and in a state where a Bragg wavelength of the second fiber Bragg grating is different from a Bragg wavelength of the first fiber Bragg grating, wherein the base includes a first base and a second base which are configured to be capable of independently moving one another, and either one of the first fiber Bragg grating and the second fiber Bragg grating is arranged on the first base and at least a part of the other fiber Bragg grating is arranged between the first base and the second base.

11. The optical fiber sensor according to claim 10, wherein the optical fiber includes one fiber Bragg grating having a single Bragg wavelength where a part of the one fiber Bragg grating constitutes the first fiber Bragg grating and another part of the one fiber Bragg grating constitutes the second fiber Bragg grating.

12. The optical fiber sensor according to claim 10, wherein the optical fiber includes two fiber Bragg gratings having equal Bragg wavelengths where either one of the two fiber Bragg gratings constitutes the first fiber Bragg grating and the other fiber Bragg grating constitutes the second fiber Bragg grating.

\* \* \* \* \*